US011029152B2

(12) United States Patent
Sahlmann et al.

(10) Patent No.: US 11,029,152 B2
(45) Date of Patent: Jun. 8, 2021

(54) METHOD AND APPARATUS FOR GENERATING POSITIONAL SENSOR DATA OF A COORDINATE MEASURING DEVICE

(71) Applicant: Carl Zeiss Industrielle Messtechnik GmbH, Oberkochen (DE)

(72) Inventors: Holger Sahlmann, Aalen (DE); Tobias Held, Noerdlingen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 659 days.

(21) Appl. No.: 15/647,484

(22) Filed: Jul. 12, 2017

(65) Prior Publication Data

US 2018/0017383 A1 Jan. 18, 2018

(30) Foreign Application Priority Data

Jul. 12, 2016 (DE) ...................... 10 2016 212 650.4

(51) Int. Cl.
| | | |
|---|---|---|
| *G01C 7/02* | (2006.01) | |
| *G01B 21/04* | (2006.01) | |
| *G01B 21/06* | (2006.01) | |
| *G01C 21/04* | (2006.01) | |
| *G01C 21/10* | (2006.01) | |
| *G01C 21/20* | (2006.01) | |

(52) U.S. Cl.
CPC .............. *G01C 7/02* (2013.01); *G01B 21/04* (2013.01); *G01B 21/06* (2013.01); *G01C 21/04* (2013.01); *G01C 21/10* (2013.01); *G01C 21/20* (2013.01)

(58) Field of Classification Search
CPC ...................................... G01C 7/02
See application file for complete search history.

(56) References Cited

U.S. PATENT DOCUMENTS

| | | | | |
|---|---|---|---|---|
| 6,131,301 A | * | 10/2000 | Sutherland | .......... G01B 21/045 |
| | | | | 33/558 |
| 6,806,968 B2 | | 10/2004 | Ruck | |
| 7,299,145 B2 | | 11/2007 | De Jonge et al. | |

(Continued)

FOREIGN PATENT DOCUMENTS

| | | |
|---|---|---|
| CN | 102792126 A | 11/2012 |
| CN | 102971605 A | 3/2013 |

(Continued)

*Primary Examiner* — Manuel A Rivera Vargas
(74) *Attorney, Agent, or Firm* — Falk Ewers; Ewers IP Law PLLC (57) ABSTRACT

A method and an apparatus for generating positional sensor data of a coordinate measuring device are provided. A sensor generates sensor data points and a trigger signal with a trigger frequency. A sensor data record is generated which includes the sensor data points and a sensor data time. The trigger signal is transmitted to a device for determining a sensor position, a position data record is determined upon or after the reception of the trigger signal, the position data record includes at least one position data point and one position data time, an assignment of position data points to sensor data points is determined depending on the sensor data time and the position data time, and a positional sensor data record is generated which includes at least one sensor data point and a position data point assigned to this sensor data point.

17 Claims, 3 Drawing Sheets

(56) References Cited

U.S. PATENT DOCUMENTS

| | | | | |
|---|---|---|---|---|
| 8,601,701 B2* | 12/2013 | Wallace | ............... | G01B 21/042 |
| | | | | 33/503 |
| 9,541,385 B2 | 1/2017 | Jonas et al. | | |
| 9,542,355 B2 | 1/2017 | Somerville | | |
| 2003/0086095 A1 | 5/2003 | Ruck | | |
| 2015/0043008 A1 | 2/2015 | Blanckaert et al. | | |
| 2015/0323300 A1* | 11/2015 | Briegel | ............... | G01B 21/047 |
| | | | | 33/503 |

FOREIGN PATENT DOCUMENTS

| | | | |
|---|---|---|---|
| CN | 104089599 | A | 10/2014 |
| DE | 10020842 | A1 | 10/2001 |
| EP | 1754951 | B1 | 2/2007 |
| EP | 1754951 | B1 | 1/2011 |

* cited by examiner

METHOD AND APPARATUS FOR GENERATING POSITIONAL SENSOR DATA OF A COORDINATE MEASURING DEVICE

CROSS REFERENCE TO RELATED APPLICATIONS

This application is claiming priority to German application 10 2016 212 650.4, filed Jul. 12, 2016, and the entire content of the application is incorporated herein by reference.

TECHNICAL FIELD

The invention relates to a method and an apparatus for generating positional sensor data of a coordinate measuring device.

BACKGROUND

For the purposes of measuring objects, use is made, inter alia, of so-called coordinate measuring devices, which are able to move a sensor relative to the object. A task within the scope of such a measurement is the assignment of a position to sensor data, in particular the assignment of a position of the sensor or of a movable part of the coordinate measuring device to sensor data in order to be able to evaluate the sensor data subsequently within the scope of a desired application, for example for measuring the object. This assignment is also known as synchronization.

There are methods in which an image capturing device generates so-called trigger signals, wherein a position of the movable part of the coordinate measuring device, to which the sensor has been fastened, is determined upon or after the reception of the trigger signal and said position is assigned to the sensor data that was generated when the trigger signal was generated.

Further, methods for correcting a constant time offset between the generation of a trigger signal and the actual determination of the position are known.

U.S. Pat. No. 7,299,145 describes an improved method for simultaneously calibrating and qualifying a contactless probe on a localization device, wherein use is made of an individual artefact, wherein the values of the contactless probe and those of the localization device are synchronized, and wherein use is made of parameters which are determined at the same time as the calibration and qualification.

Further methods are known which serve synchronization purposes when an image capturing device generates sensor data with a variable frequency.

However, the known methods have inaccuracies, in particular if the sensor is accelerated at a time when a trigger signal is generated because the captured position then does not correspond to the actual position for all image elements. Also, the known methods disadvantageously assume that all image elements of an image capturing device are captured at the same time. Further, it may be the case that individual information items for synchronization, e.g., so-called timestamps, are missing, as a result of which a quality of assignment is likewise reduced.

SUMMARY

A technical problem arises to develop a method and an apparatus for generating positional sensor data of a coordinate measuring device, which improve a quality of an assignment of positions to sensor data and/or facilitate an improved evaluation of the sensor data.

The technical problem is resolved by providing a method for generating positional sensor data of a coordinate measuring device. The method includes generating, by a sensor, sensor data points, generating a sensor data record, the sensor data record including at least one sensor data point and at least one sensor data time, generating, by the sensor, a trigger signal having a trigger frequency, transmitting the trigger signal to a device for determining a sensor position, generating a position data record upon or after receiving the trigger signal, the position data record including at least one position data point and at least one position data time, determining an assignment of the at least one position data point to the at least one sensor data point depending on the at least one sensor data time and the at least one position data time, and generating a positional sensor data record, the positional sensor data record including at least one sensor data point and a position data point assigned to the at least one sensor data point.

The technical problem is further resolved by providing an apparatus for generating positional sensor data of a coordinate measuring device, the apparatus including at least one sensor, at least one device configured to determine a position of the at least one sensor, at least one evaluation device, the at least one sensor being configured to generate sensor data points, at least one sensor data record, and trigger signals having a trigger frequency, the at least one sensor data record including at least one sensor data point and at least one sensor data time, the trigger signal being transmitted to the at least one device configured to determine the position of the at least one sensor, the at least one device configured to determine the position of the at least one sensor being configured to generate a position data record upon or after receiving the trigger signal, the position data record including at least one position data point and at least one position data time, the evaluation device being configured to determine an assignment of the at least one position data point to the at least one sensor data point depending on the at least one sensor data time and the at least one position data time and to generate a positional sensor data record, the positional sensor data record including at least one sensor data point and a position data point assigned to the at least one sensor data point.

According to an aspect of the invention, a method for generating positional sensor data of a coordinate measuring device is provided. Here, positional sensor data may denote at least one data point, which was produced by a sensor and which had assigned to it at least one position information item, for example in the form of position data. The sensor may be fastened to, or be part of, the coordinate measuring device, in particular a movable part of the coordinate measuring device. By way of the coordinate measuring device, it is possible to move the sensor relative to an object to be measured.

A sensor generates sensor data points. According to an aspect of the invention, a sensor data point may represent a property, in particular an intensity, of a signal generated by the sensor.

In particular, the sensor may be an optical sensor. According to an aspect of the invention, the sensor may be a laser scanning device, in particular a so-called line scanner, or else a different image capturing device.

A sensor data point can have a value which, for example, may be encoded by one or more bits. If the sensor is an optical sensor, a sensor data point may be an image element of the image produced by the optical sensor.

The value of a data point may be the information encoded by the data point or the content encoded by the data point.

Further, a sensor data record is generated, wherein the sensor data record includes at least one sensor data point and at least one sensor data time. The sensor data time represents a time at which the at least one sensor data point was generated or else at which all, i.e., a plurality of sensor data points of the sensor data record was generated. In particular, the sensor may generate the sensor data records with a sensor data record frequency, which may also be referred to as a data record frequency. Here, the sensor data frequency may be constant or else modifiable.

A sensor data record may include precisely one sensor data point and precisely one sensor data time. However, the sensor data record preferably includes a plurality of sensor data points. In this case, the same sensor data time may be assigned to each of the sensor data points and hence to the sensor data record. However, it is also possible for a sensor data record to include a plurality of sensor data points to which different data-point-specific sensor data times are respectively assigned.

The sensor data time can be generated in a time system of the sensor.

Further, it is possible for the sensor data record to also include a sensor data record number. This number represents the number of sensor data records which were produced after a set start time, for example after activating the sensor, or any other predetermined time. Hence, the sensor data record number may be a counter reading of a sensor data record counter.

Further, the sensor generates a trigger signal with a trigger frequency. The trigger frequency may differ from the data frequency, in particular the trigger frequency may be less than the data frequency. The trigger signal is transmitted to a device for determining a sensor position. Here, the sensor position may be determined, e.g., depending on a position of the coordinate measuring device, in particular depending on a position of displaceable axes of the coordinate measuring device. To this end, the coordinate measuring device may be calibrated, as a result of which an assignment of positions of the coordinate measuring device to a position of the sensor is known. The sensor position may denote the position of the sensor. Also, the sensor position may denote the position and orientation of the sensor.

The position of the coordinate measuring device, in particular of a movable part of the coordinate measuring device, may be provided depending on, or by way of, axis positions, wherein the movable part and/or the test object are movable about and/or along the axes. According to an aspect of the invention, a coordinate measuring device may include one or more linear axes and/or one or more axes of rotation. According to another aspect of the invention, the coordinate measuring device may include a rotary swivel joint, by which the sensor can be swiveled about one or more axes of rotation. Also, the coordinate measuring device may include a rotary table, by which the test object can be twisted about one or more axes of rotation. Also, the coordinate measuring device may include linear drives with linear axes, along which the sensor and/or the test object may be movable.

For each type of an axis arrangement of a coordinate measuring device, the sensor position may be described in the form of a so-called sensor POSE. It can encode the position and/or the orientation of the sensor. Further, a sensor POSE can encode a position and orientation with 6 degrees of freedom of movement. According to an aspect of the invention, the sensor POSE may include 6 values, with three of the values respectively encoding a translational portion and each of the three remaining values respectively encoding a rotational portion along/about three mutually independent axes. The sensor POSE may be provided in the form of the 3×1 position vector and/or a 3×3 rotation matrix or in the form of a 4×4 matrix.

It is also possible to determine a sensor position depending on a position of the coordinate measuring device, in particular depending on position of a movable part of the coordinate measuring device.

Further, a position data record is determined upon or after receiving the trigger signal. The position data record includes at least one position data point and one position data time. Here, the position data point represents or encodes the position of the sensor or of the coordinate measuring device at the time of the position data time. According to an aspect of the invention, a position data point can represent or encode one or more axis positions or a sensor POSE.

In particular, the position data time can be a time of reception of the trigger signal.

The position data time can be determined in a time system of the device for determining the sensor position. This time system of the device may differ from the time system of the sensor.

The position data record may also include a position data record number, with the number representing the number of position data records that were produced after the predetermined start time or any other predetermined time. Hence, the position data record number may also be a counter reading of a position data record counter.

It is possible for the sensor data time to be converted into a time system of the position data time, or vice versa. Also, both the sensor data time and the position data time may be converted into a common reference time system. According to an aspect of the invention, this may be brought about by zeroing, within the scope of which the time of a common start of the acquisition of position data times and sensor data times is subtracted from the respective data times. In particular, this may be carried out during an initialization.

Further, an assignment of position data to sensor data, in particular an assignment of position data points to the sensor data points of a sensor data record, is determined depending on the sensor data time and the position data time. Also, it is possible to determine an assignment of a sensor data point or of a plurality of sensor data points to a position data point. Further, a positional sensor data record is generated, the positional sensor data record including at least one sensor data point and the position data point assigned to this sensor data point. Hence, position data are thus assigned to the sensor data.

According to an aspect of the invention, a position data point of a position data record, the position data time of which corresponds to, or does not deviate by more than a predetermined measure from, the sensor data time of the sensor data record, may be assigned to at least one sensor data point of a sensor data record.

According to another aspect of the invention, for assigning position data points to sensor data points, it is also possible to determine the position data records whose position data times lie temporally before and after the sensor data time of a selected sensor data record and which have a minimal temporal distance from the sensor data time. Then, an interpolated position data point of the sensor may be determined depending on the position data points of these position data records. Here, it is possible to use a suitable interpolation, for example a linear interpolation or further interpolation methods known to a person skilled in the art, for the purposes of determining the interpolated position data point. Then, the positional sensor data record may include the sensor data and the position data point.

According to a further aspect of the invention, an inverse procedure is also possible, wherein sensor data records are determined, the sensor data times of which lie temporally after and before a position data time of a selected position data record and have a minimal temporal distance therefrom. Then, it is possible to determine an interpolated sensor data point or interpolated sensor data points, wherein the positional sensor data record then includes the position data point and the interpolated sensor data point(s).

This advantageously facilitates an accurate assignment between sensor data and position data, as a result of which the quality of positional sensor data is increased. This, in turn, advantageously facilitates an improved evaluation of the positional sensor data. According to an aspect of the invention, there may be a more accurate optical measurement of a test object by way of the sensor.

In a further exemplary embodiment, a sensor data record includes a plurality of sensor data points, wherein a data-point-specific sensor data time is assigned to each sensor data point. In this case, the number of sensor data times may equal the number of data points. Here, it is possible that the sensor data times that differ from one another are assigned to different sensor data points. This is not mandatory, however. What is important is that there is the option of assigning a data-point-specific sensor data time to each sensor data point.

Hence, it is possible not only to assign a common sensor data time to a predetermined number of sensor data points, for example all image elements of an image, but also to assign a data-point-specific sensor data time to each sensor data point, in particular each image element of an image.

Alternatively, a subset-specific sensor data time is assigned to a subset of the plurality of sensor data points. In this case, the data-point-specific sensor data times, which are assigned to the sensor data points of the subset, may be the same. Hence, it is possible to assign a subset-specific sensor data time to all sensor data points of a subset of sensor data points.

In the case of an optical sensor, the data point-specific sensor data time may, in particular, be a time of reading a pixel of the optical sensor.

A subset-specific sensor data time may be a time of reading a vector of a plurality of pixels or a matrix of a plurality of pixels.

Hence, a subset may include, e.g., all, or a predetermined number of pixels of a column or a plurality of columns of an image. Alternatively, or cumulatively, a subset may include, e.g., all, or a predetermined number of pixels of a row or a plurality of rows of an image.

Particularly in the case of so-called HDR sensors (high dynamic range sensors), it may be possible that different exposure times are set for different columns and hence that different readout times are also provided for the columns. Hence, it is also possible to subdivide a sensor data record, which was produced by such a sensor, into a plurality of sensor data partial records, with the sensor data points (pixels) of such a sensor data partial record each being assigned the same readout time. In particular, the number of sensor data partial records may correspond to the number of pixels which are read at the same time. According to an aspect of the invention, the number of sensor data partial records may correspond to the number of columns or rows.

In general, the assumption is made that optical sensors, in particular CMOS or CCD sensors, are used with a so-called global shutter. This means that all pixels of the sensor are read at the same time, for example in the form of a matrix comprising all pixels.

However, by way of appropriate trials in particular, it could be shown for some optical sensors that some pixels of the optical sensor are read earlier in time than other pixels of the optical sensor, even if a global shutter is present. This time offset between the readout times of different pixels can be constant. This time offset may also be dependent on an exposure time, wherein the exposure time may be predetermined by the user. The time offset may also be dependent on an ambient brightness.

Further, the time offset may also be dependent on an operating state of the optical sensor, which, for example, may be set by a user. According to an aspect of the invention, a so-called HDR mode (high dynamic range mode) may be an operating state. The readout time may vary depending on the light intensity in such an operating mode. It is also possible for an exposure time to vary for different columns of pixels of an optical sensor and hence also for the readout time to vary for these columns.

However, it is possible to determine the time offset between different readout times of different pixels, in particular by way of suitable calibration methods.

It is also possible for a common sensor data time to be respectively assigned to a portion of the plurality of sensor data points, wherein the portion includes at least two sensor data points. A common sensor data time may, in turn, be assigned to a further portion of sensor data points, with this sensor data time differing from the first sensor data time. In particular, this may be the case if pixels of different pixel columns or rows of the optical sensor are respectively read at the same time.

Here, readout may mean that a quantitative value, in particular a digitized value, is produced depending on a physical variable, in particular a voltage.

Thus, what advantageously emerges from the method is that time offsets between readout times of various sensor data points, which may lead to inaccuracies in a subsequent evaluation of the produced image, can be compensated. In particular, as will be explained in yet more detail below, it is possible to produce a time-referenced sensor data record, in which all sensor data points are assigned to the same sensor data time, even though pixel values were read at different times. If the sensor is an optical sensor, it is thus possible to produce a time-referenced image, in which all image elements are assigned to the same sensor data time. This time-referenced image therefore forms the ideal image when using the so-called global shutter.

A time-referenced sensor data record is determined in a further exemplary embodiment, wherein a reference time is assigned to each sensor data point in this time-referenced sensor data record. Further, values or content of the sensor data points of the time-referenced sensor data record are determined, in particular modified, depending on the reference time. According to an aspect of the invention, the reference time may be the earliest sensor data time in the plurality of sensor data times. The reference time preferably lies temporally between the earliest and the latest sensor data time of the plurality of sensor data times, particularly preferably the reference time is a temporal mean of the plurality of sensor data times. It is also possible that the reference time corresponds to a time when a trigger signal is generated.

The reference time may form the data-record-specific sensor data time. Expressed differently, the reference time may be assigned to all sensor data points of the time-referenced sensor data record as sensor data time. The fact that the values of the sensor data points are determined dependent on the reference time means, in particular, that the values of the sensor data points are modified dependent on a time offset between the respective data-point-specific sensor data time and the reference time. Suitable modification methods may be used to this end.

What emerges overall in an advantageous manner is that it is possible to generate a sensor data record, in particular also a sensor data record which represents an image, in which there is no time offset between the individual sensor data points and hence in which a production of all sensor data points at the same time, namely the reference time, is simulated. This in turn advantageously facilitates an improved evaluation of the time-referenced sensor data record, for example an improved optical measurement of an object, since the inaccuracies resulting from the time offsets of individual sensor data points are able to be minimized.

A movement information item of the sensor is determined in a further exemplary embodiment. In particular, a movement information item may be an acceleration information item, e.g., an acceleration value, and/or a speed information item, e.g., a speed value.

It is possible to determine the movement information item depending on temporally successive position information items of the sensor or of the coordinate measuring device. In particular, temporally successive axis positions may be evaluated as position information items for the purposes of determining the movement information item. These position information items can preferably be filtered. Here, phase-correct low-pass filtering is carried out in particular. Advantageously, this filtering renders it possible that a signal form is not falsified or only falsified to a minimal extent.

Further, values of the sensor data points of the time-referenced sensor data record are determined depending on the movement information item and a difference (time offset) between the data-point-specific sensor data times and the reference time. If the sensor moves during the production of the sensor data points, it is possible to calculate a position of the sensor data point at the reference time in a manner dependent on the explained difference and the movement information items, in particular the speed information item. The time-referenced sensor data record may then be produced in such a way that newly determined, positionally correct values are respectively assigned to the sensor data points.

This may also be referred to as a so-called distortion correction. According to an aspect of the invention, if an image is generated by an optical sensor with a plurality of image elements, a new image element coordinate for an image element, which differs from the original image element coordinate of the image element, can be determined depending on the time offset and the movement information item. However, it is possible that this image element coordinate does not precisely correspond to an existing (actual) coordinate of the image, in particular it may lie between two existing image element coordinates. Suitable distortion correction methods should be applied in this case. According to an aspect of the invention, a value of the image element corrected in this way may be distributed among the adjacent, existing coordinates, for example by way of a suitable interpolation method.

This advantageously results in a further improvement in the quality of positional sensor data as movement parameters which were present during the production of the sensor data points are taken into account.

Further, at least one quality factor is assigned to the positional sensor data record in an exemplary embodiment, wherein the quality factor, in particular the value thereof, is determined depending on the quality of the assignment of position data to sensor data. The positional sensor data record may include the quality factor. Therefore, the quality factor may be referred to as position-specific quality factor.

It is possible that the sensor data record includes a sensor-data-record-specific quality factor. According to an aspect of the invention, it may represent a quality of the sensor data points. According to another aspect of the invention, if it is known that the sensor generates inaccurate sensor data points in specific modes of operation, the sensor data records generated in these modes of operations may be assigned a quality factor which represents a lower quality.

Alternatively, or cumulatively, a position data record may include a position-data-record-specific quality factor. According to an aspect of the invention, it may represent a quality of the position data points. According to another aspect of the invention, if it is known that, in specific temperature regions, positions are determined with a lower accuracy than in other temperature regions, it is possible to assign a quality factor to the position data records generated in the corresponding temperature regions which represents a lower quality.

Hence, the quality factor may be a measure for the inaccuracy of sensor data points or position data points.

It is possible that one or both aforementioned quality factors are weighted by the location-specific quality factor. In particular, it is therefore possible to determine a resultant quality factor from all quality factors, said resultant quality factor then being assigned to the positional sensor data record.

Alternatively, the location-specific quality factor may be determined independently and may be assigned to the positional sensor data record.

Below, a lower quality factor may denote a quality factor which represents a lower quality, while a higher quality factor represents a quality factor representing a high quality.

The assignment of a quality factor representing the quality of the assignment advantageously facilitates an improved evaluation of the positional sensor data. According to an aspect of the invention, sensor data of a positional sensor data record with a lower quality factor, in particular a quality factor which is less than a predetermined threshold, may not be taken into account, or only taken into account to a small extent, during the evaluation. According to another aspect of the invention, if the positional sensor data records serve an image-based determination of dimensional sizes of an object to be measured during the optical measurement, positional sensor data records with low quality factors may not be taken into account during the corresponding image processing. Alternatively, image features which were determined from such sensor data records may not be taken into account during the evaluation, or may only being taken into account to a lesser extent than image features of sensor data records with a higher quality factor.

It is also possible that positional sensor data records whose quality factor is less than a predetermined threshold value are deleted and therefore not available for subsequent evaluation.

The position data record includes the quality factor in a further exemplary embodiment. This means that a quality factor is determined during or temporally after the determination of the position data record, in particular a position data point, and added to the position data record.

It is possible that the device for determining a sensor position is provided by, or corresponds to, a control device of the coordinate measuring device. This controller can determine positions of the coordinate measuring device, in particular the axis positions explained above, and/or a sensor position with a predetermined frequency, e.g., 20 kHz. Further, this control device can control a movement of the coordinate measuring device and hence also of the sensor. Here, control signals may be generated, e.g., with a lower frequency, for example with a frequency of 1 kHz. If the device for determining the position, for example, the above-noted control device, receives a trigger signal, the current position of the coordinate measuring device or the sensor position may be copied or written into a position memory. According to an aspect of the invention, the position memory can be embodied as a register. This register may also be referred to as so-called latch register. Further, the position memory may include a memory location for the position and for the position data time and, optionally, for the position data number.

The position memory may have limited memory space. According to an aspect of the invention, only one position data point, one position data time and, optionally, one position data number may be stored in the position memory. The currently stored content may be overwritten if a new position data record is copied or stored into the position memory.

The position memory may be signal-connected and/or data-connected to a buffer memory, with a position data record stored in the position memory being transferred to the buffer memory, and stored therein, with a further frequency, for example a frequency of 1 kHz. The buffer memory may store a plurality of position data records. A plurality of such buffer memories may also be present.

It is possible, particularly if the control device explained above is very busy from a computational point of view, that a position data record currently stored in the position memory is not transferred into a buffer memory in a timely fashion before the control device receives the next trigger signal. In this case, one or more position data records are missing in a sequence of temporally successive position data records. This absence can be detected on the basis of the position data times of the position data records or depending on the position data record number. If such a missing position data record is detected, it is possible to generate a replacement position data record and the latter may be inserted into the sequence in place of the missing position data record. Here, a replacement position data point may be determined, e.g., by interpolation, wherein position data records that are produced temporally before and after the missing position data record may be used for the interpolation. Further, a quality factor may be assigned to such a replacement position data record, with the quality factor representing a low quality.

Such missing position data records will occur ever more frequently the more frequently trigger signals are produced, i.e., the higher the trigger frequency is.

As a result of the position data record including the quality factor, it is possible, in an advantageous manner, to be able to take inaccuracies into account in a temporally fast and computationally simple manner when determining the position.

A movement information item of the sensor is determined in a further exemplary embodiment. This has already been explained above. Further, the quality factor is determined depending on the movement information items.

According to an aspect of the invention, an acceleration (acceleration value) of the sensor is determined, with the quality represented by the quality factor reducing with increasing absolute value of the acceleration. Here, in particular, the acceleration may be the acceleration at a position data time or a sensor data time. What advantageously emerges as a result of this is that sensor data captured at a high acceleration are assigned a lower quality factor in the positional sensor data record. This can advantageously illustrate that, in particular, sensor data points of a plurality of sensor data points at high accelerations were not, or not necessarily, captured exactly at the position which is determined upon reception of the trigger signal.

Alternatively, or cumulatively, a speed (speed value) of the sensor, in particular a speed at the sensor data time or the trigger time, is determined, with the quality represented by the quality factor reducing with increasing absolute value of the speed. Hence, a low quality may be assigned to the positional sensor data record at high speeds and a higher quality may be assigned thereto at low speeds. It was found that captured times become noisy depending on the speed, with the noise increasing with increasing speed. This may also be referred to as an undirected jitter. Hence, there is a speed-dependent falsification of the position data time. Hence, what emerges in an advantageous manner is that positional sensor data, the position data point of which was captured at higher speeds, are assigned a lower quality factor, as a result of which these may be not taken into account, or only taken into account to a reduced extent, during the subsequent evaluation.

It is possible that movement information items, in particular the acceleration and/or the speed, are only determined on the basis of position data points determined upon or after reception of a trigger signal.

Here, there may be a predetermined functional relationship between quality factor and movement information item, in particular acceleration and/or speed, in particular a linear or exponential relationship.

In a further exemplary embodiment, an estimated position data point is determined for a sensor data record to which no position data record is assignable, wherein the positional sensor data record includes at least the sensor data point(s) and the estimated position data point. Here, the estimation denotes a determination, by calculation, of the position data point or the sensor position which is represented or encoded by the position data point. According to an aspect of the invention, the position data point may be determined by interpolation, wherein the interpolation may be carried out depending on the sensor data time and depending on position data records which were produced temporally before and temporally after the sensor data record.

In particular, no position data record may be assignable to a sensor data record if a sensor data time of the sensor data record does not correspond to any position data time or if the position data time deviates by more than a predetermined measure from the existing position data times.

It is possible to assign a quality factor to a positional sensor data record determined in that way, with the maximum quality represented by such a quality factor representing a lower quality, i.e., less than a maximum quality factor. Alternatively, or cumulatively, it is possible that the quality factor is determined depending on an accuracy of the interpolation, for example depending on a level of the time offset between the sensor data time and the position data time lying closest in time to the sensor data time.

What emerges herefrom in an advantageous manner is that it is also possible to determine positional sensor data records for sensor data records which cannot be directly assigned to one position data record, wherein there may additionally also be a quality evaluation thereof.

A missing position data record is detected in a sequence of position data records in a further exemplary embodiment. According to an aspect of the invention, a missing position data record can be detected if a difference between a position data record number of a position data record and the position data record number of the position data record that was generated immediately therebefore is greater than 1 or greater than the increment used for the position data record number. Alternatively, or cumulatively, a missing position data record can be detected if a time difference between a position data record time and the position data record time that is generated directly therebefore is greater than a predetermined threshold, wherein the threshold may depend on a current frequency, in particular a trigger frequency.

Further, a replacement position data record is generated and inserted into the sequence in place of the missing position data record. Here, in particular, the replacement position data record may include in particular no position data points and no position data time. According to an aspect of the invention, the replacement position data record may, however, include a position data record number.

However, it is preferable to estimate a position data point of the replacement position data record, in particular by way of an interpolation. It is also possible to estimate a position data time, in particular by interpolation as well. To this end, use can be made of the position data points and the position data times of position data records that are generated temporally before and temporally after the missing position data record. Then, the estimated position data points and position data times can be part of the replacement position data record.

What advantageously emerges as a result thereof is that a corresponding position data record can be generated even in the case of a "lost" trigger signal, wherein this replacement position data record may then be used for the subsequent locating process. As a rule, the assumption may be made here that a replacement position data record that is determined in this way facilitates a higher quality of positional sensor data than if the missing position data record and hence the sensor data that are assignable thereto are not taken into account.

In a further exemplary embodiment, a predefined quality factor is assigned to the replacement position data record, wherein the predefined quality factor represents a low quality. Here, in particular, the low quality may be less than the maximum quality. Expressed differently, a set low quality factor is assigned to the replacement position data record, said low quality factor representing a lower quality than the maximum quality.

As a result, the replacement position data record may, in an advantageous manner, be used further for generating positional sensor data records, wherein, however, an information item to the effect that the replacement position data record contains a comparatively lower quality than an actually captured position data record is produced simultaneously.

As explained above, this allows such a positional sensor data record not to be taken into account, or to be taken into account to a lesser extent, during a subsequent evaluation.

An estimated position data point is determined for the replacement position data record in a further exemplary embodiment. This and corresponding advantages have been explained above.

In a further exemplary embodiment, a sensor data record frequency is modified, wherein the trigger frequency remains constant. If the sensor is an optical sensor, it is possible, in particular, to change the frequency of the image generation. According to an aspect of the invention, this is possible if the produced sensor data records are pre-processed, for example by the sensor itself or by an appropriate evaluation device. Thus, in this case, the sensor data record may comprise pre-processed sensor data points. According to another aspect of the invention, if it is not necessary to pre-process all sensor data points of a sensor data record, for example on account of an operating scenario, then a sensor data record frequency may be higher than in the case in which all sensor data points of a sensor data record have to be pre-processed. According to yet another aspect of the invention, if only a section of a produced image is evaluated and pre-processed, the corresponding sensor data record frequency may be higher than in the case where all sensor data points need to be pre-processed.

The proposed method advantageously facilitates the possibility of producing positional sensor data with a high quality, even in the case of changing sensor data record frequencies.

In a further exemplary embodiment, a constant component of the time difference and/or a change in the time difference between the sensor data time and the position data time is determined and compensated. This may also be referred to as drift correction. In particular, the constant component may be determined by a zeroing of the sensor data time and the position data time, wherein the zeroing can denote a comparison of the times at the set starting time. While the method is running, it is possible for the sensor data time and the position data time to elapse at different rates, for example on account of inaccuracies of the employed clocks, e.g., quartz elements.

The sensor data time may be determined in the time system of the sensor. Accordingly, the position data time can be determined in the time system of the device for determining the sensor position. Here, the appropriate conversion may take place depending on the zeroing and, optionally, also depending on the change in the time difference.

This advantageously further increases a quality of the positional sensor data since constant-component-dependent and drift-dependent inaccuracies are also minimized when assigning position data to sensor data.

A time offset between the time of producing the sensor data and the time of receiving the trigger signal is determined and compensated in a further exemplary embodiment. According to an aspect of the invention, the position data time may encode a time which corresponds to the sum of the time of the reception of the trigger signal and a predetermined time duration. The predetermined time duration may include a portion or equal a value which is dependent on the time of the production of the trigger signal during the exposure time duration. According to another aspect of the invention, if the trigger signal is generated at the start of the exposure time duration, the predetermined time duration may correspond to half of the exposure time duration. Additionally, the predetermined time duration may include one or more further component(s) which, for example, depend on a processing time of the sensor and/or the processing time of the device for determining the position. Here, the components may be determined by calibration. The compensation may be effected in a central evaluation device. The compensation may also be referred to as compensation of a so-called directed jitter.

As a result, there advantageously is a further improvement in the accuracy of the assignment.

In a further exemplary embodiment, a plurality of sensor data records are stored sequentially in a sensor data buffer. Alternatively, or cumulatively, a plurality of sensor data records is stored in a position data buffer. This has been explained above. In particular, a predetermined number of data records that were produced immediately successively in time may be stored in the respective buffer.

The storage in buffers advantageously facilitates a simplified detection of missing sensor data records and/or missing position data records. Also, an interpolation, e.g., for estimating replacement position data points, is simplified. According to an aspect of the invention, data records may be stored in a buffer in such a way that, if a missing data position record is detected, a predetermined number of, e.g., at least two, position data records that are generated temporally before the missing data record are stored in the buffer.

Further, an apparatus for generating positional sensor data of a coordinate measuring device is proposed. The apparatus includes at least one sensor, preferably an optical sensor. Further, the apparatus includes at least one device for determining a sensor position and at least one evaluation device. Sensor data points are producible by the sensor. Further, at least one sensor data record is generated, for example by the sensor or a sensor evaluation device. In particular, the sensor data record is generated with a sensor data record frequency, which may be constant or changeable. Further, the sensor data record includes at least one sensor data point and at least one sensor data time. Further, trigger signals are generated with a trigger frequency, in particular by way of the sensor, wherein a trigger signal is transmitted to the device for determining the sensor position. Furthermore, a position data record is determined upon or after the reception of the trigger signal, wherein the position data record includes at least one position data point and one position data time. Further, an assignment of position data points to sensor data points is determined by the evaluation device depending on the sensor data time and the position data time, wherein a positional sensor data record is generated, the positional sensor data record including at least one sensor data point and the position data point assigned to this sensor data point.

Preferably, at least one quality factor is further assignable to a positional sensor data record, with the quality factor being determinable depending on the quality of the assignment. This may also be effected by the evaluation device.

The apparatus may include a sensor evaluation device, wherein the sensor evaluation device is signal-connected and/or data-connected to the sensor. Further, the sensor evaluation device may evaluate, e.g., pre-process, sensor data. According to an aspect of the invention, the sensor evaluation device may be embodied by one or more microcontrollers, for example as a personal computer (PC). According to an aspect of the invention, pre-processing of the sensor data may be carried out by the sensor evaluation device. Further, there may be buffered storage of sensor data records in the sensor evaluation device.

Further, the apparatus may include a control and evaluation device for the coordinate measuring device, said control and evaluation device being signal-connected and/or data-connected to the coordinate measuring device. The device for determining the position may be part of this control and evaluation device.

The control and evaluation device may include or provide a position data record memory and a buffer for position data records.

The mentioned sensor data evaluation device and/or the control and evaluation device of the coordinate measuring device may be data-connected and/or signal-connected to the evaluation device. All devices may include one or more microcontrollers. Also, the devices may each include one or more memories or memory devices.

The evaluation device may include or provide a buffer for sensor data records and a buffer for position data records. Further, the evaluation device may include or provide a buffer for positional sensor data records.

The apparatus advantageously facilitates carrying out a method in accordance with one of the exemplary embodiments explained in this disclosure. Hence, the apparatus is embodied in such a way that such a method can be carried out by the apparatus.

BRIEF DESCRIPTION OF THE DRAWINGS

The invention will now be described with reference to the drawings wherein.

DESCRIPTION OF EXEMPLARY EMBODIMENTS

Identical reference signs hereinafter designate elements having identical or similar technical features.

Figure 1:
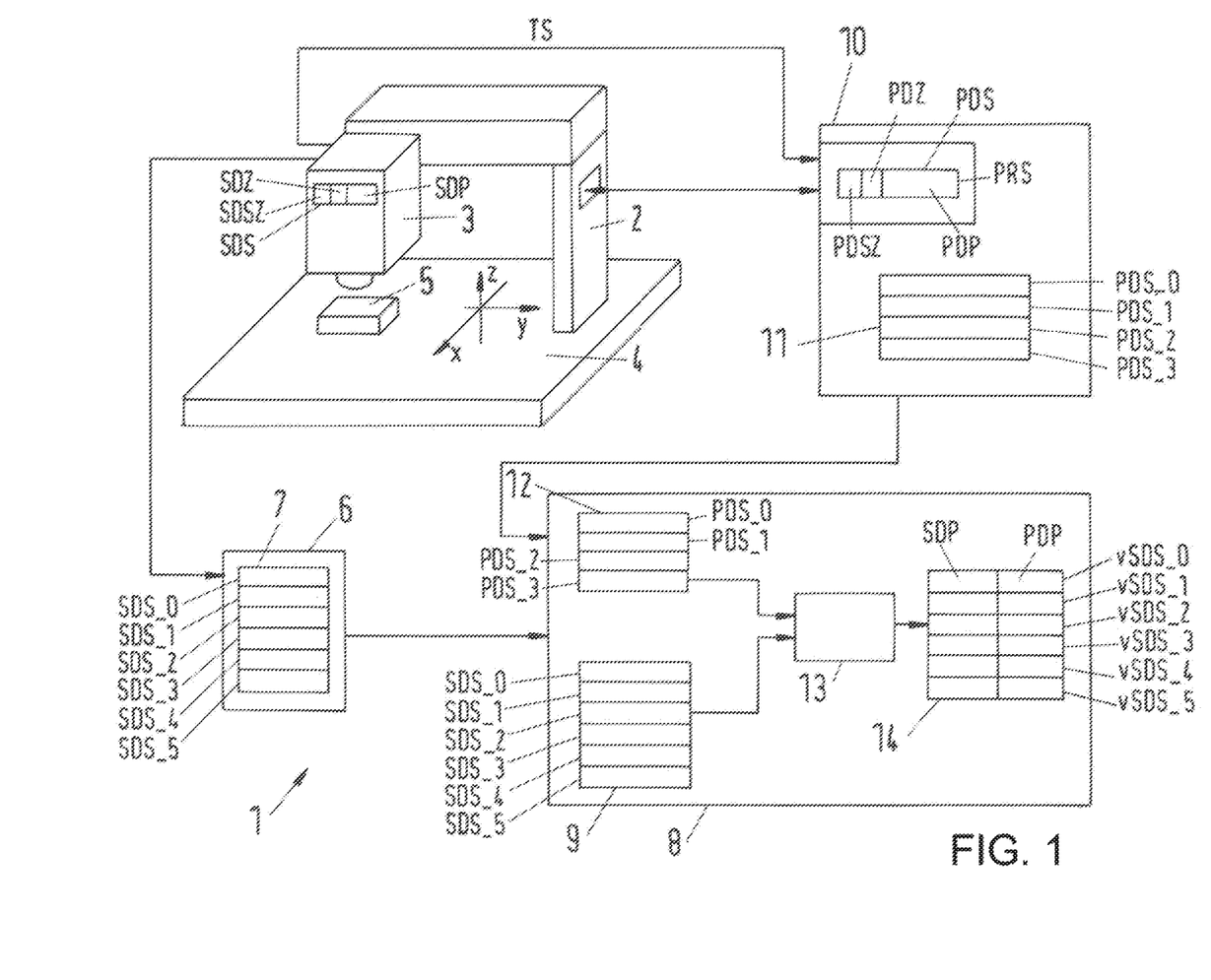
FIG. 1 shows a schematic block diagram of an apparatus according to an exemplary embodiment of the invention.

FIG. 1 shows a schematic block diagram of an apparatus 1 according to an exemplary embodiment of the invention. The apparatus 1 includes a coordinate measuring device 2 with a sensor 3 which, in particular, may be embodied as an optical sensor. Depicted further is a measurement table 4, arranged on the surface of which is a test object 5 which is measured by the sensor 3. The sensor 3 is movable along three spatial directions x, y, z by the coordinate measuring device, in particular along linear axes, that are oriented perpendicular to one another. Here, a vertical direction z may be oriented parallel to a direction of gravitational acceleration and opposite to a gravitational force.

An exemplary embodiment in which the sensor 3 is an optical sensor, in particular an image capturing device or laser scanner, is described below. However, the explanations may of course also be applied to other sensors that operate in a contactless manner or on a tactile basis.

The sensor 3 generates sensor data points SDP. According to an aspect of the invention, a sensor data point SDP may represent an intensity value. Here, a sensor data point SDP may include a predetermined number of bits. Further, sensor data records SDS, SDS_0, . . . , SDS_5 are generated. The sensor data records SDS, SDS_0, . . . , SDS_5 are generated by the sensor 3 in the present exemplary embodiment. However, it is also possible for the sensor data records SDS, SDS_0, . . . , SDS_5 to be generated by a sensor evaluation device 6. The sensor data records SDS, SDS_0, . . . , SDS_5 may be produced with a constant or changeable frequency. The sensor data record SDS, SDS_0, . . . , SDS_5 includes exactly one sensor data point or a plurality of sensor data points SDP. Further, the sensor data record SDS, SDS_0, . . . , SDS_5 includes a sensor data record counter SDSZ and a sensor data time SDZ. The sensor data time SDZ is a time at which the one sensor data point SDP or the plurality of sensor data points SDP was/were generated. FIG. 1 shows the sensor data record SDS, SDS_0, ..., SDS_5 as including only one sensor data point SDP. However, the sensor data record SDS, SDS_0, ..., SDS_5 may include a plurality of sensor data points SDP.

The sensor data record SDS, SDS_0, ..., SDS_5 is then transferred to a sensor evaluation device 6, which is signal-connected and/or data-connected to the sensor 3. The sensor evaluation device 6 may include or provide a buffer 7 (sensor data record buffer) for sensor data records SDS_0, ..., SDS_5, wherein the sensor data records SDS_0, SDS_1, SDS_2, SDS_3, SDS_4, SDS_5 that were generated immediately successively in time may be stored. Here, a buffer denotes a memory for a plurality of data records. Of course, more or fewer than the six sensor data records SDS_0, ..., SDS_5 depicted in the exemplary embodiment may be stored in the buffer 7.

Further, the sensor evaluation device 6 may carry out pre-processing of the sensor data records SDS_0, ..., SDS_5, in particular of the sensor data points SDP. However, this is not mandatory.

The sensor evaluation device 6 is signal-connected and/or data-connected to a central evaluation device 8. The central evaluation device 8 includes an additional buffer 9 for sensor data records SDS_0, ..., SDS_5 or provides this buffer. Here, the sensor data records SDS_0, ..., SDS_5 may be transferred from the sensor evaluation device 6 to the additional buffer 9 of the central evaluation device 8, for example by way of a Transmission Control Protocol (TCP) connection.

It is also conceivable for the sensor data records SDS to be transferred directly from the sensor 3 to the central evaluation device 8 and, for example, into the buffer 9 thereof.

As further shown, sensor 3 generates a trigger signal TS. The trigger signal TS may be generated with a predetermined trigger frequency. Further, the trigger signal TS is transmitted to a control and evaluation device 10 of the coordinate measuring device 2. The control and evaluation device 10 serves to control the coordinate measuring device 2, in particular to control movement.

What is shown is that the control and evaluation device 10 of the coordinate measuring device 2 is signal-connected and/or data-connected to the coordinate measuring device 2. In particular, position information items about movable axes of the coordinate measuring device 2, e.g., in the form of axis positions, may be transferred therefrom to the control and evaluation device 10 of the coordinate measuring device 2. A position data record PDS is generated upon reception of a trigger signal TS or at a predetermined time offset temporally after the reception of a trigger signal TS. It includes a position data point PDP, a position data record counter PDSZ and a position data time PDZ. Here, the position data point PDP represents a position of the coordinate measuring device 2, but preferably a sensor position, wherein the sensor position may denote a spatial position and spatial orientation of the sensor 3.

FIG. 1 shows that the position data record PDZ is stored in a position register memory PRS, wherein only a single position data record PDZ can be stored in the position register memory PRS. If a new trigger signal TS is received, the currently stored position data record PDS is overwritten by a new position data record PDZ.

Further, the control and evaluation device 10 includes, or keeps available, a first buffer 11 for position data records PDS_0, ..., PDS_3. Position data records PDS_0, PDS_1, PDS_3, which are read immediately successively in time from the position register memory PRS, are stored in this first buffer 11. Here, reading may be carried out with a predetermined readout frequency, e.g., 1 kHz.

A so-called lost trigger signal event may occur here, depending on the trigger frequency and computational load of the control and evaluation device 10. In such a case, a position data record PDZ that is stored in the position register memory PRS is overwritten before it is transferred into the buffer 11.

Further, the control and evaluation device 10 of the coordinate measuring device 2 is signal-connected and/or data-connected, for example by way of a TCP connection, to the central evaluation device 8. It may include or provide a further buffer 12 for position data records PDS_0, ..., PDS_3, into which the position data records PDS_0, ..., PDS_3, which are stored in the buffer 11 of the control and evaluation device 10 of the coordinate measuring device 2, are transferred.

Positional sensor data records vSDS_0, vSDS_1, vSDS_2, vSDS_3, vSDS_4, vSDS_5 may be generated depending on the sensor data times SDZ and the position data times PDZ of the sensor data records SDS_0, ..., SDS_5 and position data records PDS_0, ..., PDS_3 that are stored in buffers 9 and 12, with such a positional sensor data record vSDS_0, ..., vSDS_5 including sensor data points SDP and the position data points PDP assigned to these sensor data points SDP. The positional sensor data records vSDS_0, ..., vSDS_5 may be stored in buffer 14 for these positional sensor data records vSDS_0, ..., vSDS_5.

The positional sensor data records vSDS_0, ..., vSDS_5 may then be provided for further applications. To this end, the central evaluation device 8 may include a data transfer interface, by which the positional sensor data vSDS_0, ..., vSDS_5 may be transferred to further devices, e.g., to a device for determining dimensional sizes.

Here, the positional sensor data records vSDS_0, ..., vSDS_5 may be determined by a computer device 13 of the central evaluation device 8.

In the case in which a sensor data record SDS, which is generated by sensor 3, only includes a single sensor data point SDP, the sensor evaluation device 6 may, e.g., determine a time-referenced sensor data record which includes a plurality of sensor data points SDP, wherein, however, a common reference time as sensor data time SDZ may be assigned to each one of the plurality of sensor data points SDP. It is also conceivable for such a time-referenced sensor data record to be generated by sensor 3.

If the sensor 3 is an optical sensor, a sensor data point SDP may represent an image point of the produced image. Here, exactly one image point and one image-point-specific sensor data time may be contained in a sensor data record SDS.

In this case, a time-referenced image with a predetermined number of image points may be generated, with a reference time being assigned to each image point. Further, values of the image points of the time-referenced image are determined depending on the reference time, in particular depending on a time difference between the time of generating the corresponding value (readout time) and the reference time. In particular, values of the image points of the time-referenced image may be determined depending on movement information items and a difference between the image-point-specific sensor data times and the reference time.

According to an aspect of the invention, movement information items may be determined by the control and evaluation device 10 of the coordinate measuring device 2. In particular, acceleration and speed information items or values of the coordinate measuring device 2, in particular of movable parts, and hence also of the sensor 3 may be determined depending on the position information items. According to another aspect of the invention, these may be transmitted to the sensor 3 by a signal-connection and/or data-connection (not depicted here) and/or to the sensor evaluation device 6 by way of a corresponding signal-connection and/or data-connection (not depicted here). The movement information items may also be transferred to the central evaluation unit 8.

A filter device for filtering the captured or transmitted position information items that can carry out phase correct low-pass filtering of the position information items is likewise not shown in FIG. 1. According to an aspect of the invention, the filter device may be provided by the central evaluation device 8.

Depending on the movement information items, it is possible to calculate a speed information item, for example in the form of a velocity vector, in a sensor plane, and in particular in an image plane. This may be brought about by a fixed transformation which, for example, was determined in advance by trials. Then it is possible to determine a shift in position, e.g., in the form of an image position shift, of each sensor data point SDP depending on the velocity vector and the time offset between the data-point specific sensor data time and the reference time. In order to determine a time-referenced sensor data record, in particular a time-referenced image, it may then be necessary to carry out a distortion correction, for example by interpolation, in order to obtain a grid display from the position-shifted sensor data points.

Further, it is possible for a positional sensor data record vSDS_0, . . . , vSDS_5 to include a quality factor QF (see FIG. 2), with the quality factor QF being determined depending on the quality of the assignment and being assigned, in particular added, to the corresponding positional sensor data record vSDS_0, . . . , vSDS_5. Here, a high-quality factor QF can represent a high quality and a low-quality factor QF can represent a low quality of the positional sensor data record vSDS_0, . . . , vSDS_5.

The quality factor QF may be determined depending on a movement information item, in particular depending on an acceleration information item and/or a speed information item. The movement information item may be an information item about the movement, in particular the acceleration and/or the speed, at which the sensor 3 was moved at the corresponding sensor data time SDZ or position data time PDZ.

The movement information items may be transferred from the control and evaluation device 10 of the coordinate measuring device 2 to the central evaluation device 8. The central evaluation device 8 is also able to determine the movement information items depending on the position data points SDP stored in the buffer 12.

In particular, a low-quality factor QF may be assigned to a positional sensor data record vSDS_0, . . . , vSDS_5 in the case of a high acceleration of the sensor 3 at the sensor data time SDZ of the corresponding positional sensor data record vSDS_0, . . . , vSDS_5, with the corresponding positional sensor data record vSDS_0, . . . , vSDS_5 being assigned a higher-quality factor QF in the case of a lower acceleration. A corresponding statement applies to speed. Hence, the quality factor QF may be inversely proportional to the acceleration and to the speed.

Figure 2:
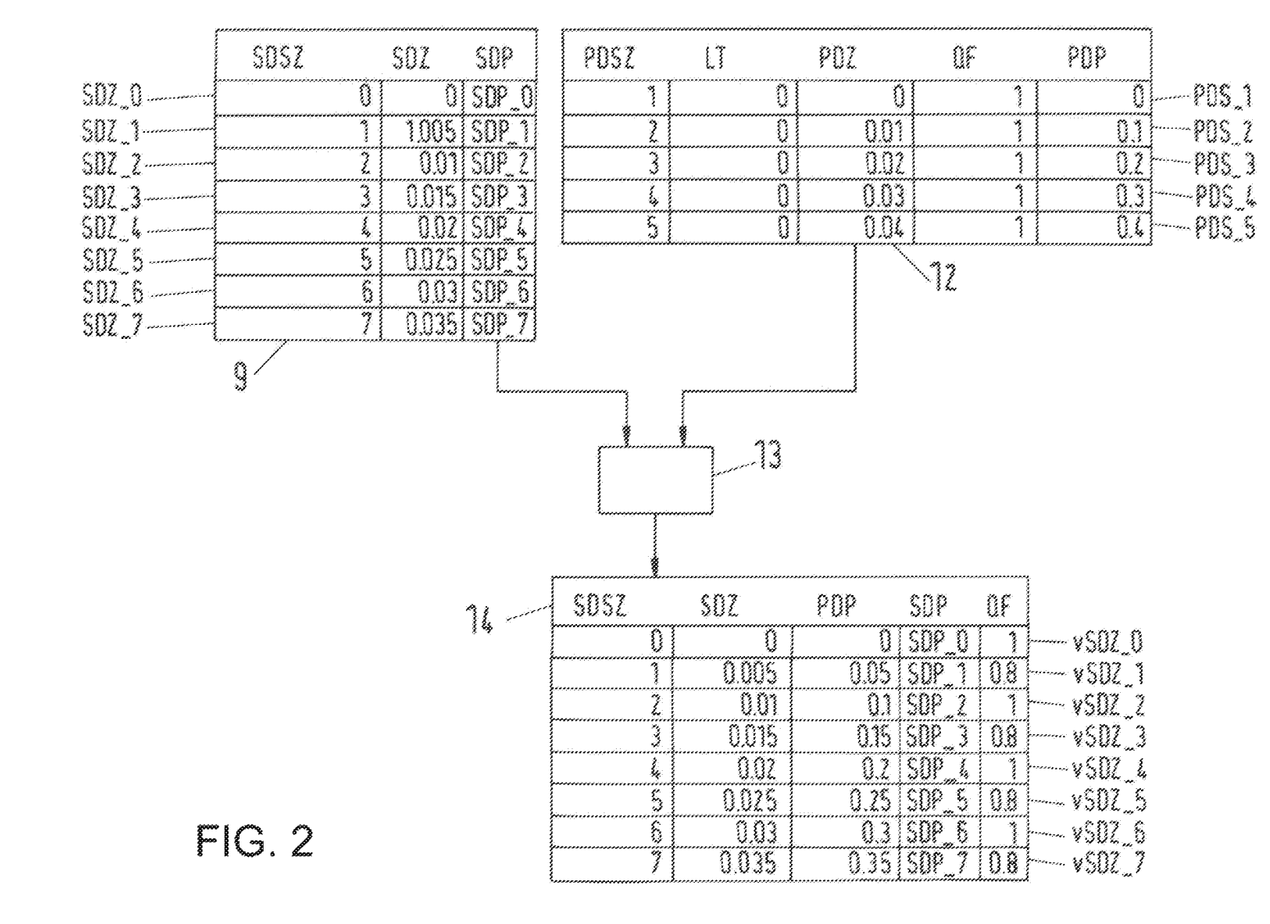
FIG. 2 shows a schematic flowchart of a method according to an exemplary embodiment of the invention.

FIG. 2 shows a schematic flowchart of a method according to an exemplary embodiment of the invention. A buffer 9 for sensor data records SDZ_0, . . . , SDZ_7 of a central evaluation device 8 is depicted. Eight sensor data records SDZ_0, . . . , SDZ_7 are stored in buffer 9. Each sensor data record SDZ_0, . . . , SDZ_7 includes a sensor data record counter SDSZ, a sensor data time SDZ and one or more sensor data points SDP_0, . . . , SDP_7. The reference sign SDP_0, . . . , SDP_7 may denote exactly one or a predetermined number of sensor data points SDP.

Further, a buffer 12 for position data records PDS_1, . . . , PDS_5 of the central evaluation device 8 is shown. Five position data records PDS_1, PDS_2, PDS_3, PDS_4, PDS_5 are stored in buffer 12. Each of the position data records PDS_1, . . . , PDS_5 includes a position data record counter PDSZ, a position data time PDZ, a quality factor QF and a position data point PDP. In addition, each position data record PDS_1, . . . , PDS_5 includes a trigger loss indicator LT, wherein the trigger loss indicator can assume a value of 1 or 0, with a value of 1 indicating trigger loss.

What is depicted here is that the sensor data times SDZ and the position data times PDZ were captured or determined in a common time system. This may be brought about by suitable calibration of the time systems of the sensor 3 and of the control and evaluation device 10 of the coordinate measuring device 2. Further, it is also possible to capture and compensate or correct a changing time difference between the time systems (drift correction).

The specified times may, for example, be specified in seconds. Further, the position data points PDP may be specified in millimeters. What is depicted here is that only the position of a Z-axis of the coordinate measuring device 2 is stored in the position data record buffer 12. A position data record PDS_1, . . . , PDS_5 may also include position values for the further movable axes of the coordinate measuring device 2.

Positional sensor data records vSDZ_0, . . . , vSDZ_7 may be determined by computer device 13, which, for example, may be embodied as a microcontroller or may include the latter. The number of positional sensor data records vSDZ_0, . . . , vSDZ_7 equals the number of sensor data records SDZ_0, . . . , SDZ_7 stored in the sensor data record buffer 9. However, this is not mandatory.

What is depicted here is that the position data point PDP and the quality factor QF of the first position data record PDS_1 were assigned to the first sensor data record SDZ_0, wherein the correspondingly produced positional sensor data record vSDZ_0 includes the sensor data record counter SDSZ, the sensor data time SDZ and the sensor data point(s) of this first sensor data record SDZ_0, and a corresponding quality factor QF and the corresponding position data point PDP.

Accordingly, the second position data record PDS_2 is assigned to the third sensor data record SDZ_2, the third position data record PDS_3 is assigned to the fifth sensor data record SDZ_4, and the fourth position data record PDS_4 is assigned to the seventh sensor data record SDZ_6.

Position data points PDP were respectively estimated, in particular determined by interpolation, for the second, fourth, sixth and eighth sensor data record SDZ_1, SDZ_3, SDZ_5, SDZ_7. Here, a linear interpolation, in particular, is possible. Other types of interpolation, e.g., a quadratic or logarithmic interpolation, are also conceivable here. For interpolation purposes, the position data points PDP of the positional sensor data records vSDZ_0, vSDZ_2, vSDZ_4, vSDZ_6 produced temporally immediately before and immediately afterwards in each case are taken into account. According to an aspect of the invention, a position data point of 0.05 mm is determined for the second sensor data record SDZ_1 since the position data point PDP of the first positional sensor data record vSDZ_0 has a value of 0 mm and the position data point PDP of the third positional sensor data record vSDZ_2 has a value of 0.1 mm and the sensor data time SDZ of the second sensor data record SDZ_1 lies temporally in the middle between the position data times PDZ of the first positional sensor data record vSDZ_0 and the third positional sensor data record vSDZ_2.

A lower quality factor QF, for example a quality factor QF of 0.8, may be assigned to the positional sensor data records vSDZ_1, vSDZ_3, vSDZ_5, vSDZ_7, whose position data points PDP were estimated in each case, than to the positional sensor data records vSDZ_0, vSDZ_2, vSDZ_4, vSDZ_6, to which an actually captured position data point PDP can be assigned in each case, with these sensor data records being able to be assigned a maximum quality factor. Here, a quality factor of 1 represents a maximum quality factor. A quality factor of 0 may correspond to a minimum quality factor.

Figure 3:
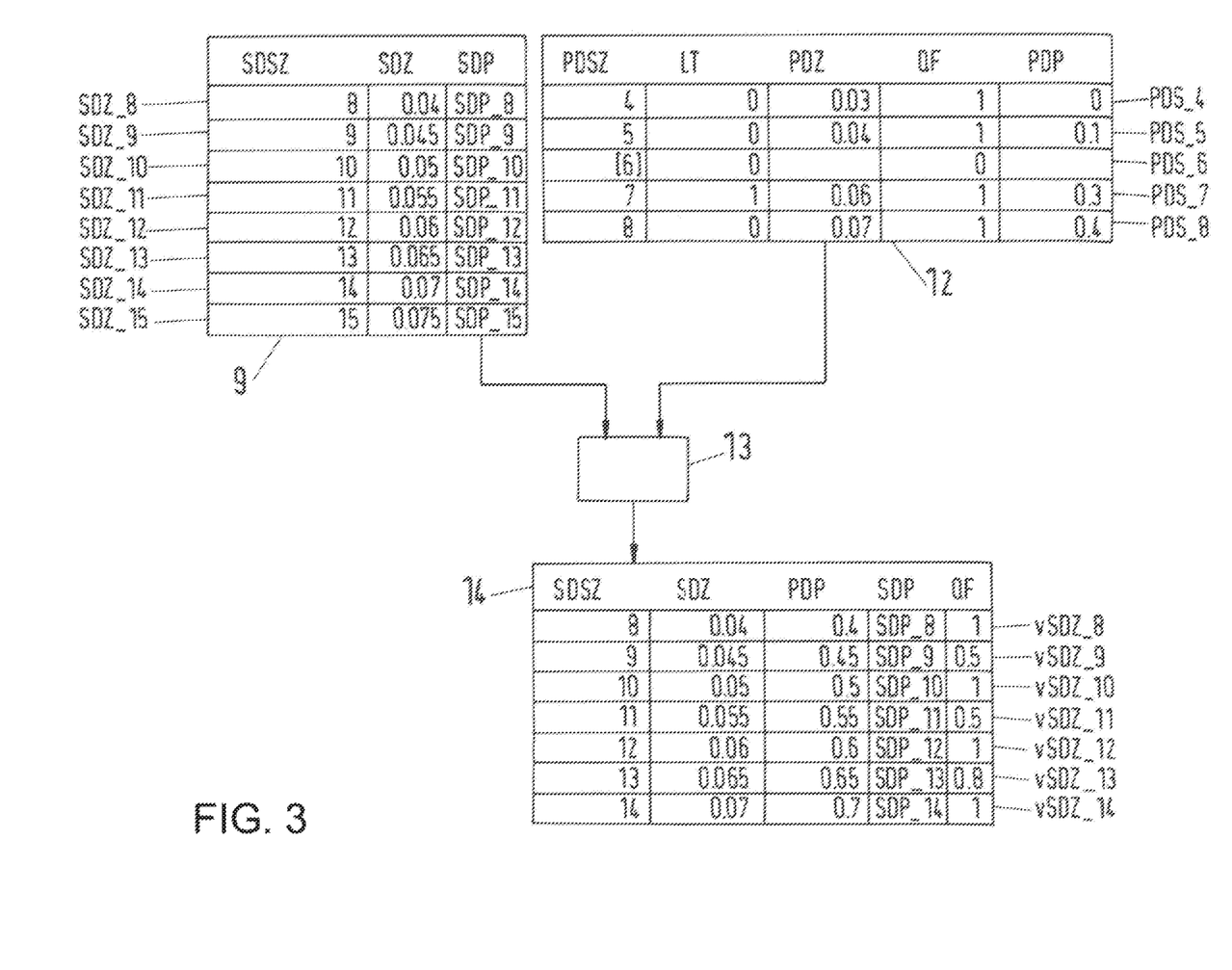
FIG. 3 shows a further schematic flowchart of a method according to an exemplary embodiment of the invention.

FIG. 3 shows a further schematic flowchart of a method according to an exemplary embodiment of the invention. Depicted, once again, is a buffer 9 for sensor data records SDZ_8, . . . , SDZ_15 with sensor data records SDZ_8, . . . , SDZ_15 stored therein. Further shown is a buffer 12 for position data records PDS_4, . . . , PDS_8 with position data records PDS_4, . . . , PDS_8 stored therein. According to an aspect of the invention, the buffer 12 may include a predetermined number of storage positions, wherein the oldest position data record in terms of time is deleted when a current position data record PDS_4, . . . , PDS_8 is added. The corresponding statement may apply to the buffer 9.

In accordance with the explanations made in relation to FIG. 2, a fifth position data record PDS_5 may be assigned to an eighth sensor data record SDZ_8, a seventh position data record PDS_7 may be assigned to a twelfth sensor data record SDZ_12 and an eighth position data record PDS_8 may be assigned to a fourteenth sensor data record SDZ_14 for the purposes of producing positional sensor data records vSDZ_8, vSDZ_12, vSDZ_14.

Depicted further is a missing position data record, namely the sixth position data record PDS_6. According to an aspect of the invention, it may have been generated by the position register memory PRS depicted in FIG. 1, but may have been overwritten by a new position data record PDS, namely the seventh position data record PDS_7, prior to the transfer into the buffer 11. When storing position data records PDS_4, . . . , PDS_8 into the buffer 12, it is possible to detect, for example by the evaluation device 13, that the sixth position data records PDS_6 is missing. It may be replaced by a replacement position data record, wherein, in the replacement position data record, a value for the position data record counter and a low-quality factor QF, for example the minimum quality factor QF, in this case 0, may be assigned.

According to an aspect of the invention, a position data point PDP may, further, be estimated for this replacement position data record by the computer device 13, in particular be determined by interpolation. According to another aspect of the invention, this may be carried out taking into account the position data records PDS_4, PDS_5, PDS_7, PDS_8 produced temporally immediately before and thereafter. In the exemplary embodiment depicted in FIG. 3, a position data point of, e.g., 0.2 mm may be assigned to the replacement position data record by interpolation.

In accordance with the explanations in respect of the exemplary embodiment depicted in FIG. 2, the corresponding position data points PDP may be estimated, in particular determined by interpolation, for the purposes of generating positional sensor data records vSDZ_9, vSDZ_11, vSDZ_13, wherein, in addition to the actually determined position data points PDP of the fourth, fifth, seventh and eighth position data record PDS_4, PDS_5, PDS_7, PDS_8, the estimated position data point PDP of the replacement position data record may also be taken into account. However, in this case, in contrast to the exemplary embodiment depicted in FIG. 2, positional sensor data records vSDZ_9, vSDZ_11, the position data points PDP of which were estimated depending on the replacement position data record, may be assigned lower quality factors QF than the positional sensor data records vSDZ_13, the position data points of which were estimated dependent on actually determined and hence not estimated position data records PDS.

Further, it is conceivable that at least one or two or more than two position data records PDS are always stored in the buffer 12, the position data points PDP of these position data records having been actually captured and not estimated. Advantageously, this simplifies an interpolation.

It is understood that the foregoing description is that of the exemplary embodiments of the invention and that various changes and modifications may be made thereto without departing from the spirit and scope of the invention as defined in the appended claims.

LIST OF REFERENCE NUMERALS

1 Apparatus
2 Coordinate measuring device
3 Sensor
4 Measurement table
5 Test object
6 Sensor evaluation device
7 Buffer for sensor data records
8 Central evaluation device
9 Buffer for sensor data records
10 Control and evaluation device of the coordinate measuring device
11 Buffer for position data records
12 Buffer for position data records
13 Computer device
14 Buffer for positional sensor data records
TS Trigger signal
SDP Sensor data point
SDZ Sensor data time
SDSZ Sensor data record counter
SDS, SDS_0, . . . , SDS_15 Sensor data records
x, y, z Spatial directions
PDZ Position data time
PDP Position data point
PDSZ Position data record counter
PRS Position register memory
PDS, PDS_0, . . . , PDS_8 Position data records
vSDS_0, . . . , vSDS_14 Positional sensor data records

What is claimed is:

1. A method for generating positional sensor data of a coordinate measuring device, the method comprising:
  generating, by a sensor, sensor data points;
  generating a sensor data record, the sensor data record including at least one sensor data point and at least one sensor data time;
  generating, by the sensor, a trigger signal having a trigger frequency;

transmitting the trigger signal to a device for determining a sensor position;
generating a position data record upon or after receiving the trigger signal, the position data record including at least one position data point and at least one position data time;
simultaneously capturing the at least one position data time and the at least one position data point;
assigning the at least one position data point to the at least one sensor data point by matching the at least one sensor data time and the at least one position data time, wherein the at least one position data time and the at least one sensor data time are defined in a common time system; and
generating a positional sensor data record, the positional sensor data record including at least one sensor data point and a position data point assigned to the at least one sensor data point.

2. The method of claim 1, wherein:
the sensor data record includes a plurality of sensor data points, and
the method further comprises:
assigning a data-point-specific sensor data time to each of the plurality of sensor data points, or
assigning a subset-specific sensor data time to a subset of the plurality of sensor data points.

3. The method of claim 2, further comprising:
determining a time-referenced sensor data record;
assigning a reference time to each of the plurality of sensor data points; and
determining values of the sensor data points of the time-referenced sensor data record depending on the reference time.

4. The method of claim 3, further comprising:
determining a movement information item of the sensor,
determining values of the sensor data points of the time-referenced sensor data record depending on the movement information item and a difference between the data-point-specific sensor data times and the reference time.

5. The method of claim 1, further comprising:
assigning at least one quality factor to the positional sensor data record, the quality factor being determined depending on a quality of the assigning of the at least one position data point to the at least one sensor data point.

6. The method of claim 5, wherein the position data record includes the quality factor.

7. The method of claim 5, further comprising:
determining a movement information item of the sensor; and
determining the quality factor depending on the movement information item.

8. The method of claim 1, further comprising:
determining an estimated position data point for a sensor data record to which no position data record is assignable, the positional sensor data record including the at least one sensor data point and the estimated position data point.

9. The method of claim 1, further comprising:
detecting a missing position data record in a sequence of position data records;
generating a replacement position data record; and
inserting the replacement position data record into the sequence of position data records in place of the missing position data record.

10. The method of claim 9, further comprising:
assigning a predefined quality factor to the replacement position data record, the predefined quality factor representing a low quality.

11. The method of claim 9, further comprising:
determining an estimated position data point for the replacement position data record.

12. The method of claim 1, further comprising:
modifying a sensor data record frequency; and
maintaining the trigger frequency at a constant level.

13. The method of claim 1, further comprising:
determining at least one of a constant component of a time difference and a change in the time difference between the at least one sensor data time and the at least one position data time; and
compensating the at least one of the constant component of the time difference and the change in the time difference between the at least one sensor data time and the at least one position data time.

14. The method of claim 1, further comprising:
determining a time offset between a time of generating sensor data and a time of generating the trigger signal; and
compensating the time offset between the time of generating the sensor data and the time of generating the trigger signal.

15. The method of claim 1, further comprising:
sequentially storing at least one of a plurality of sensor data records in a sensor data buffer and a plurality of position data records in a position data buffer.

16. An apparatus for generating positional sensor data of a coordinate measuring device, the apparatus comprising:
at least one sensor;
at least one device configured to determine a position of the at least one sensor;
at least one evaluation device;
the at least one sensor being configured to generate sensor data points, at least one sensor data record, and trigger signals having a trigger frequency;
the at least one sensor data record including at least one sensor data point and at least one sensor data time;
the at least one position data time and the at least one position data point being simultaneously captured;
the trigger signal being transmitted to the at least one device configured to determine the position of the at least one sensor;
the at least one device configured to determine the position of the at least one sensor being configured to generate a position data record upon or after receiving the trigger signal;
the position data record including at least one position data point and at least one position data time; and
the evaluation device being configured to determine an assignment of the at least one position data point to the at least one sensor data point by matching the at least one sensor data time and the at least one position data time and to generate a positional sensor data record, the positional sensor data record including at least one sensor data point and a position data point assigned to the at least one sensor data point, wherein the at least one position data time and the at least one sensor data time are defined in a common time system.

17. An apparatus for generating positional sensor data of a coordinate measuring device, the apparatus comprising:
at least one sensor;
at least one device configured to determine a position of the at least one sensor;
at least one evaluation device;

the at least one sensor being configured to generate sensor data points and trigger signals having a trigger frequency;
a sensor evaluation device configured to generate at least one sensor data record;
the at least one sensor data record including at least one sensor data point and at least one sensor data time;
the at least one position data time and the at least one position data point being simultaneously captured;
the trigger signal being transmitted to the at least one device configured to determine the position of the at least one sensor;
the at least one device configured to determine the position of the at least one sensor being configured to generate a position data record upon or after receiving the trigger signal;
the position data record including at least one position data point and at least one position data time; and
the evaluation device being configured to determine an assignment of the at least one position data point to the at least one sensor data point depending onby matching the at least one sensor data time and the at least one position data time and to generate a positional sensor data record, the positional sensor data record including at least one sensor data point and a position data point assigned to the at least one sensor data point, wherein the at least one position data time and the at least one sensor data time are defined in a common time system.

* * * * *

UNITED STATES PATENT AND TRADEMARK OFFICE
CERTIFICATE OF CORRECTION

PATENT NO. : 11,029,152 B2  
APPLICATION NO. : 15/647484  
DATED : June 8, 2021  
INVENTOR(S) : Holger Sahlmann et al.

Page 1 of 1

It is certified that error appears in the above-identified patent and that said Letters Patent is hereby corrected as shown below:

In the Claims

For Claim 17:

In Column 23:
Line 21: Delete "at least one sensor data point depending onby matching" and insert -- at least one sensor data point by matching -- therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*